Patented Dec. 5, 1939

2,182,617

UNITED STATES PATENT OFFICE 2,182,617

POLYMERIZATION OF OLEFINS

Richard Michel, Krefeld-Uerdingen, Germany, assignor to I. G. Farbenindustrie Aktiengesellschaft, Frankfort-on-the-Main, Germany No Drawing. Application October 23, 1936, Serial No. 107,151. In Germany November 6, 1935

5 Claims. (Cl. 260—683)

This invention relates to the polymerization of olefins. In accordance with the invention it is possible in carrying out the said polymerization to effect the formation of one of the normal components of the polymerization product preferentially by maintaining the component of the product which is not desired to be produced in excess during the polymerization.

According to the invention for the purpose of favouring the formation of one component, the other undesired component is added to the original mixture prior to starting the reaction, or the component which it is desired to produce preferentially is continuously removed from the reaction mixture. For example, when it is desired to produce low polymerized components of the polymerization mixture during the polymerization in the known manner, this can be attained by adding to the original polymerization mixture prior polymerized products, or the desired low polymerized components can be continuously removed from the reaction mixture by distillation during the polymerization.

The process of the present invention is applicable to the polymerization of olefins in the presence of catalysts of all kinds, for example in the presence of catalysts of the Friedel-Craftstype, such as aluminium chloride, ferric chloride and zinc chloride, particularly good results being obtainable by carrying out the process of this invention with an acid of phosphorus, an acid ester of an acid of phosphorus or a solution of an anhydride of an acid of phosphorus in an acid of phosphorus, for example according to the process of the corresponding application Ser. No. 25,183, with compounds of boron fluoride containing a hydrogen atom removable by dissociation, such as compounds of boron fluoride with water, alcohols and acids, for example the dihydrate of boron fluoride, the dialcoholates of boron fluoride with methyl alcohol, ethyl alcohol, chloroethyl alcohol, propyl alcohol, the compounds of boron fluoride with formic acid, monochloro acetic acid, propionic acid, oxalic acid, benzoic acid etc. (as described in the paper by H. Meerwein in Journal für praktische Chemie, volume 141, page 123 ff. parts 5–8), for example according to the corresponding application Ser. No. 31,731, and finally with compounds of boron fluoride with ethers, for example the compounds of boron fluoride with diethyl ether, dipropyl ether, ethylpropyl ether (as described in the paper by H. Meerwein in Journal für praktische Chemie, 1932, volume 134, page 66, parts 1–3), for example according to the French Patent No. 801,883.

Among the olefins which can be polymerized according to the present invention may be mentioned for example ethylene, propylene, $\alpha$-butylene, $\beta$-butylene, isobutylene, butadiene, amylene, nonylene, dodecylene, cyclohexene and methylcyclohexene.

It is by no means necessary for the process of the invention to employ these olefins in a pure state. They may indeed be used in admixture with one another or with other gases, such as for example, in the form of waste gases derived from the hydrogenation of carbon or from cracking processes.

The invention is illustrated but not restricted by the following examples:

Example 1

In a copper autoclave propylene gas is stirred into 700 parts by weight of a mixture of 500 parts by weight of phosphoric acid and 500 parts by weight of a fraction of isononylene of the boiling range of 130–150° C. at a temperature of about 180° C. and with a pressure of about 20 atmospheres above the normal until 650 parts by weight of the polymerization product have been obtained. This polymerization product consists of about 10% of isononylene and 90% of isododecylene.

When the same polymerization reaction of the propylene is carried out in the presence of phosphoric acid but in the absence of isononylene, the resultant polymerization product consists of 45% isononylene and 55% isododecylene.

Example 2

By carrying out the polymerization of propylene in the manner described in Example 1, in the presence of isododecylene instead of the isononylene, a polymerization mixture is obtained, consisting of 70% isononylene and 30% isododecylene, whilst as already stated in Example 1, when polymerizing propylene in the absence of isododecylene a polymerization product results, consisting of 45% of isononylene and 55% of isododecylene.

Example 3

Isobutylene is stirred into a mixture of 780 parts by weight of concentrated phosphoric acid and 500 parts by weight of triisobutylene (boiling range 70–100° C. at 30 mms. pressure) at a temperature of 80° C. and a pressure of 2 atmospheres until an increase in weight of 680 parts by weight has been recorded. The newly formed polymerization product consists of 80% diisobutylene and only 20% triisobutylene, whilst the polymerization of butylene in the absence of a component of the polymerization mixture leads to a polymerization product, containing 60% of diisobutylene and 40% of triisobutylene.

Example 4

Coke oven gas, enriched in olefins and comprising about 50% propylene and 10% butylene, is stirred into concentrated phosphoric acid at about 170° C. and at a pressure of 10–15 atmospheres above normal. The polymerization is conducted in such a manner that the low boiling component of the polymerization product is removed from the reaction vessel together with the gas freed from olefins. By working as indicated, there is produced a mixture of polymerization products, consisting of 75% of propylene and butylene polymerization products, boiling up to 160° C. The remaining 25% of the polymerization product possesses a higher boiling point.

When, however, the same reaction is carried out without removing the low boiling component of the polymerization product from the sphere of the reaction, a polymerization product is obtained containing only 15% of the low boiling component (up to 160° C.), whilst 85% of the polymerization product boils at a higher temperature.

Example 5

By carrying out the polymerization of propylene in the manner described in Example 1, in the presence of boron fluoride dihydrate instead of phosphoric acid at a temperature of 80–100° C. and a pressure of 25 atmospheres, a polymerization product is obtained consisting of 12% of isononylene and 88% of isododecylene.

I claim:

1. Process for the polymerization of a normally gaseous olefin of at least 3 carbon atoms which comprises reacting upon such an olefin with a catalyst capable of effecting polymerization of said olefin in the presence of an excess of a polymerization component normally formed from said olefin during the reaction in order to suppress formation of said polymerization component during the reaction.

2. In a process for the production of low-boiling polymers from normally gaseous olefins containing at least 3 carbon atoms, wherein a stream of said gaseous olefins is passed through a polymerizing zone containing a polymerizing catalyst maintained under conditions favoring the formation of said low-boiling polymers but wherein substantial amounts of higher boiling polymers are normally formed, the improvement which comprises maintaining within said polymerizing zone an amount of said higher boiling polymers in substantial excess of that currently formed during the passage of said gaseous olefins through said polymerizing zone to suppress formation of said higher boiling polymers.

3. A process as defined in claim 1 wherein the normally gaseous olefin is present in a coke oven gas fraction comprising propylene and butylene, wherein the catalyst is concentrated phosphoric acid and wherein the polymerization is effected at a temperature of about 170° C. and a pressure of about 10–15 atmospheres.

4. A process as defined in claim 1 wherein the normally gaseous olefin is propylene, wherein the catalyst is phosphoric acid, wherein the polymerization is effected at a temperature of about 180° C. and a pressure of about 20 atmospheres and wherein the polymerization component present in excess is isononylene.

5. A process as defined in claim 1 wherein the normally gaseous olefin is propylene, wherein the catalyst is phosphoric acid, wherein the polymerization is effected at a temperature of about 180° C. and a pressure of 20 atmospheres and wherein the polymerization component present in excess is isododecylene.

RICHARD MICHEL.